United States Patent
Sato

(10) Patent No.: US 8,711,437 B2
(45) Date of Patent: Apr. 29, 2014

(54) CORRECTING COLOR PLATE DATA FOR MIS-REGISTRATION IN A SUB-SCANNING DIRECTION BY PERFORMING A PIXEL TRANSITION AT THE TRANSITION POINT ALIGNED IN THE MAIN-SCANNING DIRECTION

(75) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/439,472

(22) Filed: Apr. 4, 2012

(65) Prior Publication Data

US 2012/0281256 A1 Nov. 8, 2012

(30) Foreign Application Priority Data

Apr. 4, 2011 (JP) ................. 2011-082889

(51) Int. Cl.
*H04N 1/58* (2006.01)
*G06K 15/14* (2006.01)
*H04N 1/50* (2006.01)

(52) U.S. Cl.
CPC ................. *H04N 1/58* (2013.01); *H04N 1/506* (2013.01); *H01N 1/12* (2013.01); *G03G 2215/0158* (2013.01)
USPC ........................... 358/3.26; 358/540; 347/116

(58) Field of Classification Search
None
See application file for complete search history.

(56) References Cited

U.S. PATENT DOCUMENTS 6,614,506 B2 * 9/2003 Kodama et al. ................ 347/116
6,661,440 B2 * 12/2003 Nishigaki et al. ............. 347/116
8,274,699 B2 * 9/2012 Hirose et al. ................... 358/1.9

FOREIGN PATENT DOCUMENTS

JP 2007-003896 A 1/2007

* cited by examiner

*Primary Examiner* — Scott A Rogers
(74) *Attorney, Agent, or Firm* — Canon USA Inc. IP Division

(57) ABSTRACT

An image processing apparatus and a method thereof for setting, in a case where a plurality of component colors of a special-color object specified with a special color is included and a transition point is included in a region of the special-color object in image data, a transition point located in the region at a position where a generation of color unevenness can be reduced.

11 Claims, 13 Drawing Sheets

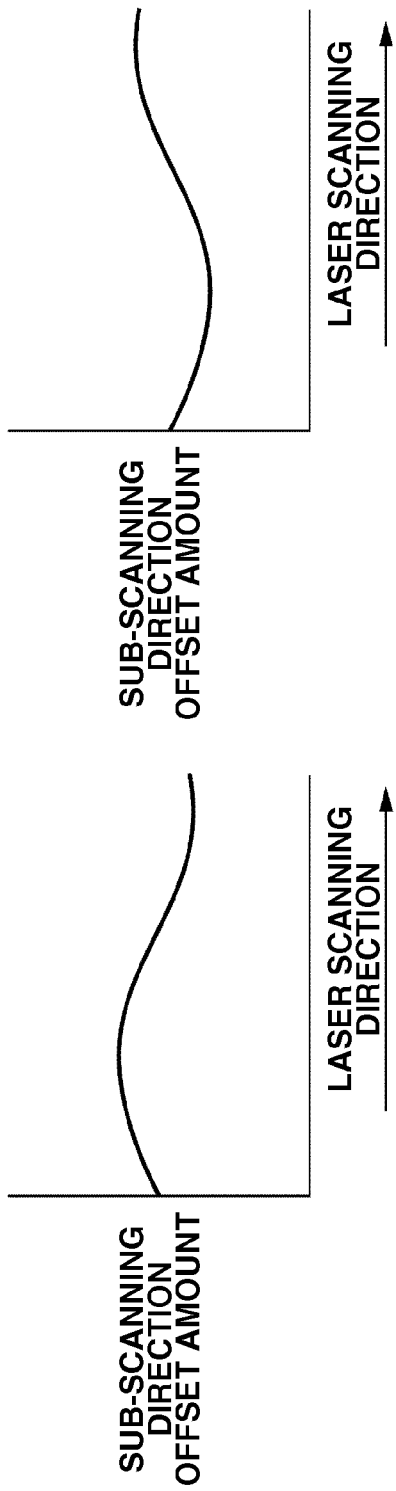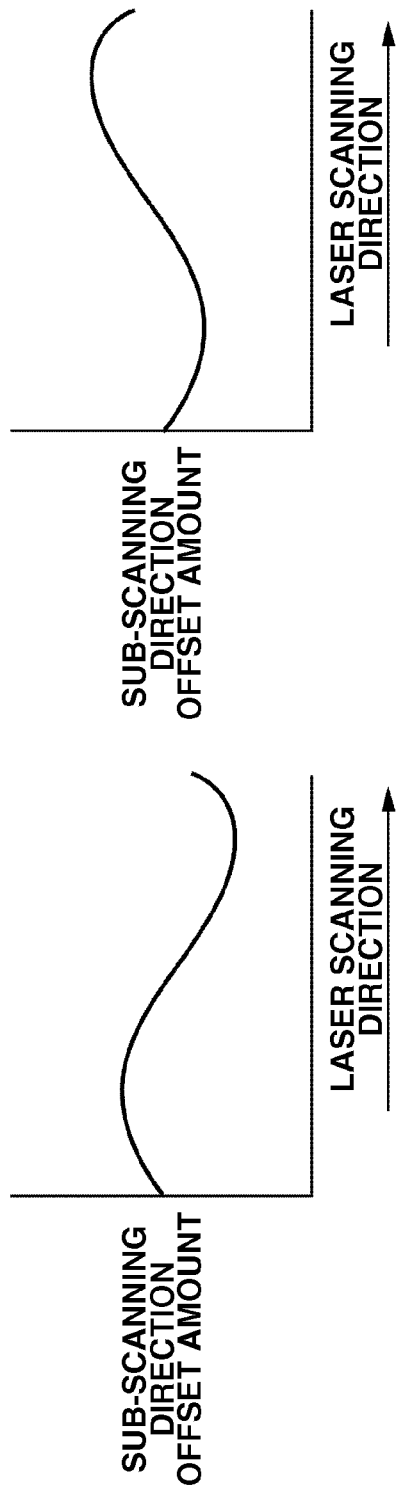

FIG.13
EXAMPLE)
 : CYAN
 : MAGENTA
■ : BLUE
WHEN CYAN + MAGENTA = BLUE
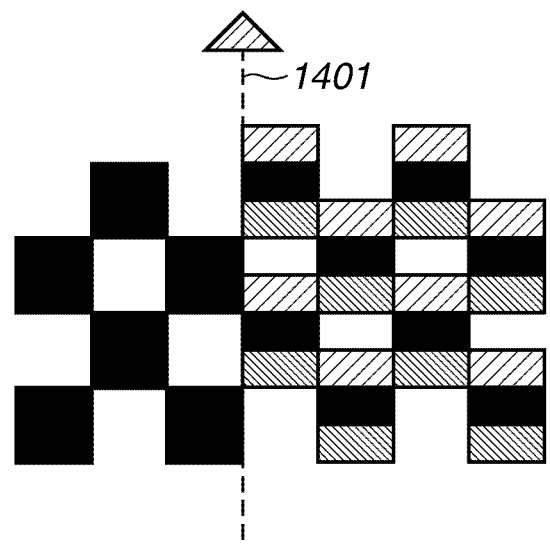

CORRECTING COLOR PLATE DATA FOR MIS-REGISTRATION IN A SUB-SCANNING DIRECTION BY PERFORMING A PIXEL TRANSITION AT THE TRANSITION POINT ALIGNED IN THE MAIN-SCANNING DIRECTION

BACKGROUND OF THE INVENTION

1. Field of the Invention

The present invention relates to a technique for correcting an image to be formed by a plurality of image forming units that has mis-registration in a sub-scanning direction.

2. Description of the Related Art

As an image recording method used for a color image forming apparatus such as a color printer and a color copy machine, an electrophotographic type is known. The electrophotographic type forms a latent image on a photosensitive drum using a laser beam, and develops the latent image with charged color materials (hereinbelow, referred to as "toner"). An image developed by toner is transferred onto a transfer sheet and fixed thereon to record the image.

In recent years, to form the image by the color image forming apparatus of the electrophotographic type at high speed, the color image forming apparatuses of the tandem type have been increasingly produced that include the same number of image forming units (developing devices and photosensitive drums) as those of toner colors, and subsequently transfer the images having different colors onto an image conveying belt or a recording medium.

In general, in the image forming apparatus, the image forming units corresponding to respective four process colors of cyan (C), magenta (M), yellow (Y), and black (K) are sequentially disposed in order of transfer. It is known that such a color image forming apparatus of a tandem type causes mis-registration because of a plurality of factors, and thus various methods for dealing with those factors are discussed.

One of the factors is inconsistency of a lens of an exposure device for irradiating the photosensitive drum with the laser beam, mis-positioning of mounting the lens, and mis-positioning of mounting the exposure device into a main body of the color image forming apparatus. The mis-positioning causes tilt or skew of an exposure scanning line, and a degree of the skew (hereinbelow, referred to as a "profile") varies depending on the color, which may cause mis-registration. Further, the characteristic of profile is different depending on each image forming apparatus, recording engine, and also color.

As a method for dealing with such mis-registration, Japanese Patent Application Laid-Open No. 2007-3896 discusses a method for measuring a size of the tilt and the skew of the exposure scanning line using an optical sensor, correcting image data to offset the influence of the tilt and the skew, and then forming the corrected image. Since this method performs electrical correction to process the image data, a mechanical adjustment member and an adjusting procedure for assembly are not necessary. Accordingly, the color image forming apparatus can be reduced in size, and the mis-registration can be dealt with at low cost.

In electrically correcting the mis-registration (registration correction), correction is performed in a unit of one pixel and that in less than one pixel. In correction of a pixel unit, according to an amount of correction of the tilt and the skew of the exposure scanning line, the pixel of the image data is offset in unit of one pixel in a sub-scanning direction. In the descriptions hereinbelow, the processing of the offset is referred to as "transition processing", and a position for performing the offset is referred to as a "transition point".

In correction for less than one pixel, gradation values of the pixels on both sides of a boundary of the transition point in the image data are each adjusted based on gradation values of pixels on both sides thereof in the sub-scanning direction. By performing the correction in less than one pixel, an unnatural gap at the boundary of the transition point incurred by the correction of a pixel unit is solved, thereby creating a smooth image. The processing for correcting less than one pixel is referred to as "interpolation processing".

When the color image forming apparatus performs printing, a special color may be specified for an object as a corporate color to print the object having the special color. This printing can be realized by specifying, when giving a print command, an absolute color appearing after the object is printed.

Specification of this color is referred to as "special-color specification", and the object for which the special color is specified is referred to as a special-color object. The absolute color is, for example, a value defined by the Commission International de L'eclairage (CIE) and can be expressed in a color space of L*a*b* that is independent from a device.

In the correction of a pixel unit described above (transition processing), each color includes a different transition point. Therefore, for example, when a certain component color includes a transition point on an image rendered by mixing color materials of two or more colors, difference in the mixed color is incurred near the boundary of the transition point as illustrated in FIG. 13.

FIG. 13 illustrates a case where there is a transition point 1401 of cyan on an object in blue composed of cyan and magenta, and an upward triangle illustrated at an upper portion of the transition point 1401 indicates that the cyan is offset by one pixel in a direction of the upward triangle. When there is the transition point on the object specified with the special color as described above, it may cause a problem in that color unevenness is incurred near the boundary of the transition point.

SUMMARY OF THE INVENTION

The present invention is directed to an image processing apparatus and a control method thereof capable of reducing abrupt color unevenness near a boundary of a transition point, when electronic registration correction is performed and when an object specified with a special color is printed.

According to an aspect of the present invention, an image processing apparatus processing image data includes: a setting unit configured to, in a case where a plurality of component colors are included and a transition point of the component color is included in a region of the special-color object, set outside the region of the special-color object the transition point located therein; a correction unit configured to, for color-plate data of a plurality of color plates acquired from image data, perform pixel transition of the color plate data in a sub-scanning direction at the transition point aligned in a main-scanning direction; and an image forming unit configured to form an image corresponding to each of the color-plate data corrected by the correction unit.

According to the present invention, the image processing apparatus performing the electronic registration correction controls the position of the transition point on the object specified with the special color. With the control described above, the color unevenness of the color appearing after the object specified with the special color is printed can be efficiently reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 11A to 11D illustrate examples of optical curves and correction directions.

FIG. 13 illustrates the color unevenness on the special-color object.

DESCRIPTION OF THE EMBODIMENTS

Various exemplary embodiments, features, and aspects of the invention will be described in detail below with reference to the drawings.

Figure 1:
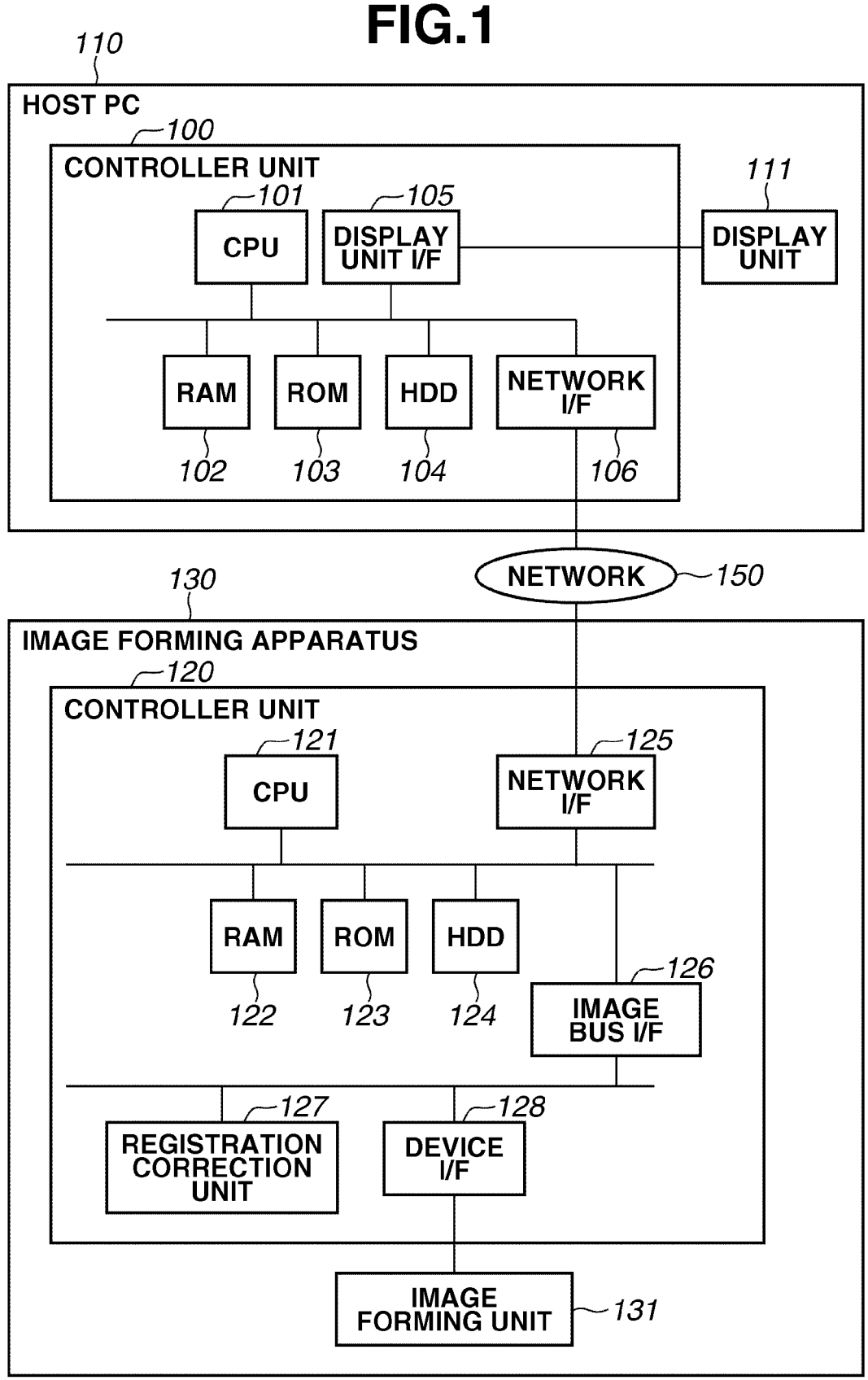
FIG. 1 is a configuration diagram of hardware including a host personal computer (PC) and an image forming apparatus according to a first exemplary embodiment.

FIG. 1 is a configuration diagram of hardware including a host personal computer (PC) 110 (information processing apparatus) and an image forming apparatus 130 (image processing apparatus) to perform the present exemplary embodiment.

The host PC 110 includes a controller unit 100 and a display unit 111. The controller unit 100 includes a central processing unit (CPU) 101, a random access memory (RAM) 102, a read only memory (ROM) 103, a hard disk drive (HDD) 104, a display unit interface (I/F) 105, and a network I/F 106, which are connected with one another via a system bus of the host PC 110.

The ROM 103 stores a program for controlling the operation of the host PC 110 such as a boot program. Further, the HDD 104 stores programs of application software 202 and a printer driver 204 described below.

The display unit I/F 105 is an interface unit with the display unit (monitor) 111, and outputs to the display unit 111 image data to be displayed thereon. The network I/F 106 is an interface unit for connecting the host PC 110 to a network 150 such as a local area network (LAN) and a wide area network (WAN). The host PC 110 is connected to the image forming apparatus 130 via the network 150.

The image forming apparatus 130 includes a controller unit 120 and an image forming unit 131. The controller unit 120 includes a CPU 121, a RAM 122, a ROM 123, an HDD 124, a network I/F 125, an image bus I/F 126, a registration correction unit 127, and a device I/F 128.

The ROM 123 stores a program for controlling the image forming apparatus 130 such as a boot program. The CPU 121 loads each program stored in the ROM 123 into the RAM 122 and executes the program to control an operation of the image forming apparatus 130. Further, the RAM 122 temporarily stores data determined by various processing performed while the image forming apparatus 130 is in operation.

The network I/F 125 of the image forming apparatus is, as with the network I/F 106 of the host PC 110, an interface unit for connecting the image forming apparatus 130 to the network 150. The image forming apparatus 130 connected to the host PC 110 via the network receives the image data from the host PC 110.

The CPU 121, the RAM 122, the ROM 123, the HDD 124, and the network I/F 125 are connected to one another via the system bus of the image forming apparatus 130, and the registration correction unit 127 and the device I/F 128 are connected to each other via the image bus of the image forming apparatus 130. The image bus I/F 126 is an interface unit for connecting the system bus and the image bus to each other included in the image forming apparatus 130, and transmits/receives the image data via the image bus I/F 126.

Figure 4:
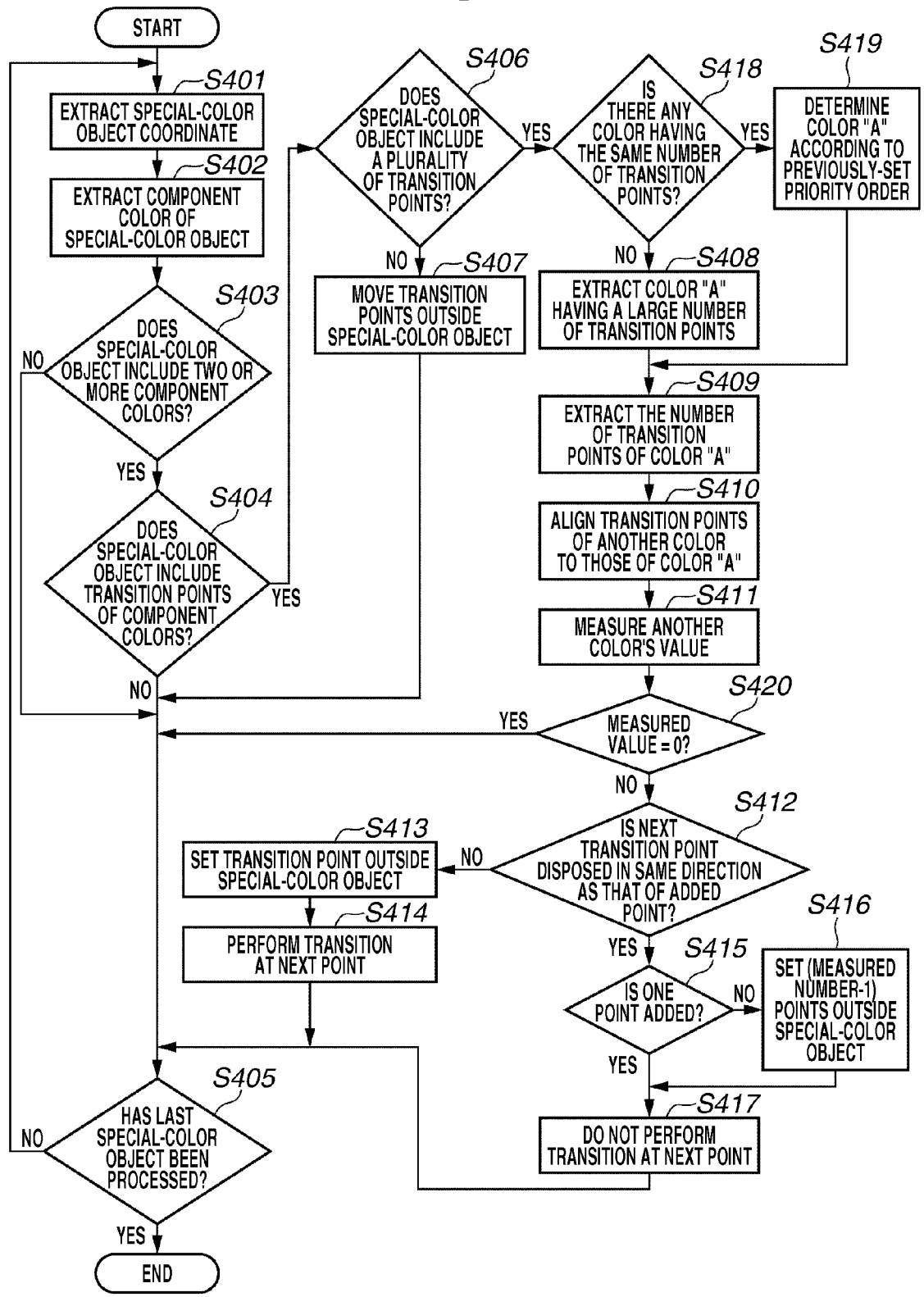
FIG. 4 is a flowchart illustrating an operation of a transition point setting unit.

The registration correction unit 127 receives the image data via the image bus I/F 126, and performs each processing of the flowchart illustrated in FIG. 4. The device I/F 128 is an interface unit for transmitting the image data processed by the registration correction unit 127 to the image forming unit 131.

The image forming unit 131 prints the received image data onto a print medium such as paper and discharges the print product. Further, the image forming unit 131 includes a profile storage unit storing data of the profile (profile data) that indicates a skew characteristic of laser scanning of each color of C, M, Y, K. The profile data stores a position of mis-registration in a main-scanning direction and a direction of mis-registration by one pixel every time one pixel is offset in the sub-scanning direction, for example.

Figure 10A:
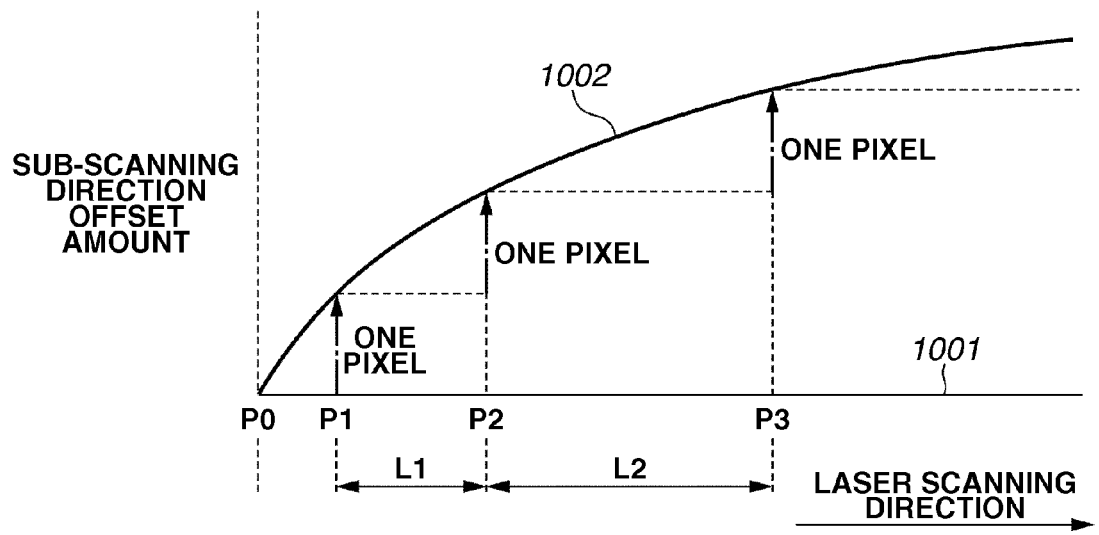
FIGS. 10A and 10B illustrate examples of optical curves and transition points.
Figure 10B:
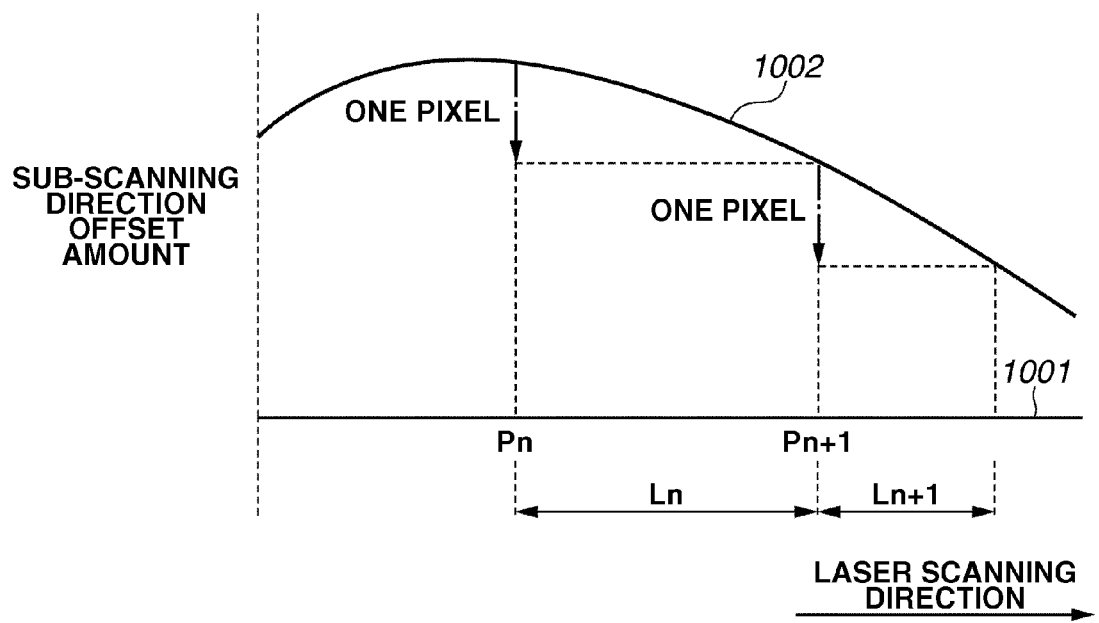

The profile of the exposure scanning line for each color of the image forming apparatus 130 will be described. In FIGS. 10A and 10B, as the profile of the image forming apparatus, FIG. 10A illustrates a region in which a skew characteristic 1002 of the laser scanning is upwardly offset as advancing in a laser-scanning direction. Further, as the profile of the image forming apparatus, FIG. 10B illustrates a region in which a skew characteristic 1002 of the laser scanning is downwardly offset as advancing in the laser-scanning direction. A direction (main-scanning direction) 1001 of a laser scanning line indicates an ideal direction.

FIGS. 11A to 11D illustrate relationships between a diagram illustrating a direction in which the correction is performed based on the profile and a diagram illustrating the direction of the profile. As the direction in which the correction is to be performed, when the profile is indicated as illustrated in FIG. 11A, the correction is performed in the opposite direction thereof as illustrated in FIG. 11B. When the profile is indicated as illustrated in FIG. 11C, the correction is performed as illustrated in FIG. 11D.

With reference to FIG. 10A, the transition point in a region in which the laser scanning is gradually shifting upwardly will be described. The transition point according to the present exemplary embodiment indicates a point offset by one pixel in the sub-scanning direction from the ideal laser scanning line 1001. In other words, in FIG. 10A, the points P1, P2, and P3 that are offset by one pixel in the sub-scanning direction on the upward skew characteristic 1002 correspond to the transition points.

In FIG. 10A, the transition points are illustrated with the point P0 as a reference. As illustrated in FIG. 10A, a distance (L1, L2) between the transition points becomes short in a region in which the skew characteristic 1002 rapidly changes, and becomes long in a region in which the skew characteristic 1002 slowly changes.

Next, with reference to FIG. 10B, the transition point in a region in which the laser scanning is gradually shifting downwardly will be described. Also, in the region in which the characteristic of the laser scanning shifting downwardly is illustrated, a definition of the transition point is a point offset by one pixel in the sub-scanning direction. In other words, in FIG. 10B, Pn and Pn+1 that are the points offset by one pixel on the downward skew characteristic 1002 in the sub-scanning direction.

Also in FIG. 10B, as with in FIG. 10A, the distance (Ln, Ln+1) between the transition points becomes short in a region in which the skew characteristic 1002 rapidly changes, and long in a region in which the skew characteristic 1002 slowly changes.

As described above, the transition point is closely related to a degree of change of the skew characteristic 1002 of the image forming apparatus. Therefore, the image forming apparatus having a rapid skew characteristic generates a large number of transition points. On the other hand, the image forming apparatus having the slow skew characteristic generates a small number of transition points.

As already described above, since the skew characteristic of the image forming apparatus varies depending on each color, the image forming apparatus has a different number of transition points and positions.

Figure 2:
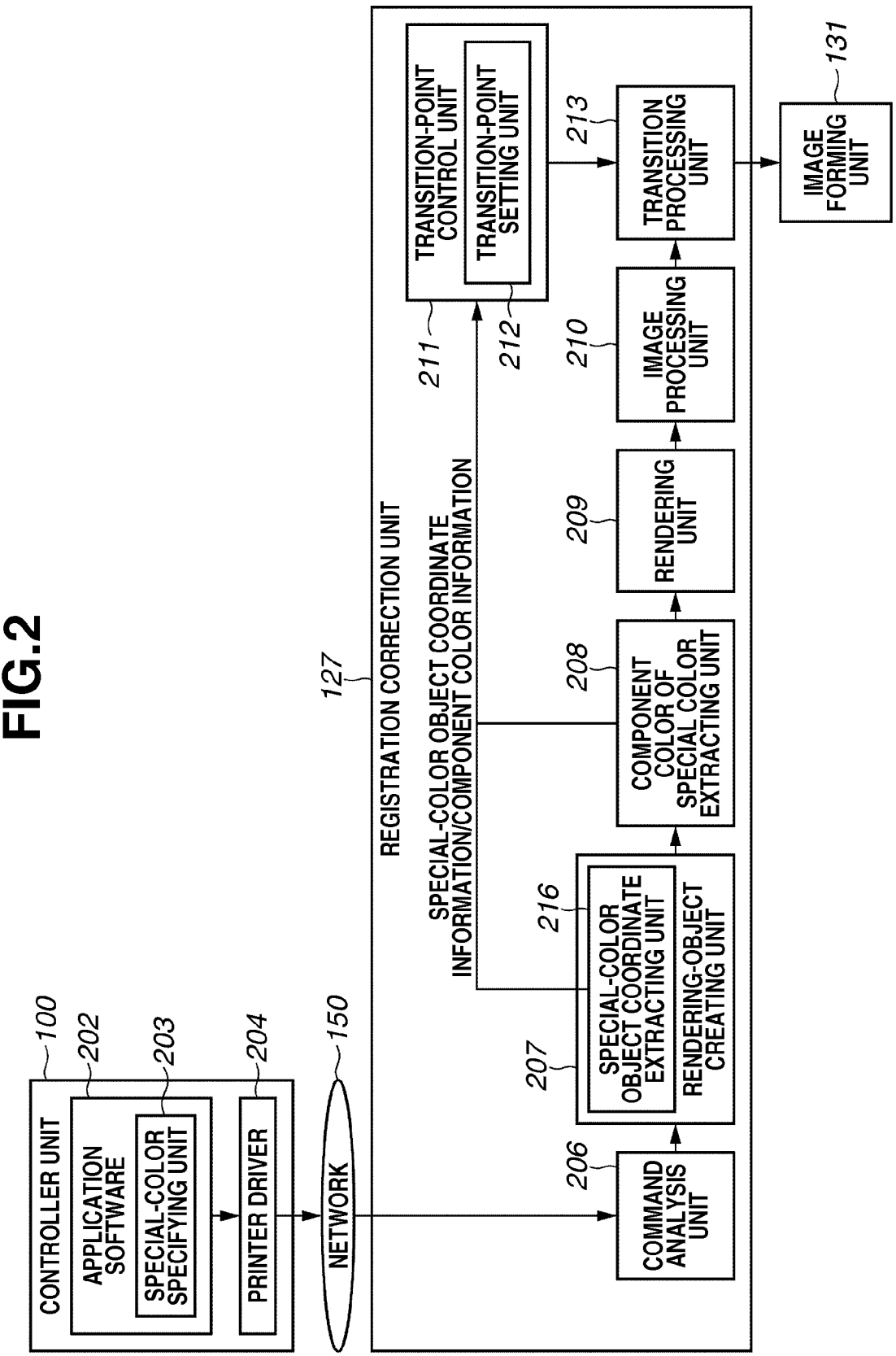
FIG. 2 is a block diagram of processing for realizing the first exemplary embodiment.

FIG. 2 is a function configuration diagram illustrating processing blocks for guaranteeing a color of the object specified with the special color by controlling a position of the transition point according to the present exemplary embodiment. The image forming apparatus 130 is connected to the host PC 110 that generates and transmits the print image data via the network 150.

For the sake of simple and easy descriptions, FIG. 2 is illustrated in such a manner that the controller unit 100 of the host PC 110, the registration correction unit 127 included in the controller unit 120 of the image forming apparatus 130, and the image forming unit 131 of the image forming apparatus 130 are connected to one another.

Actually, the print image data from the controller unit 100 is transmitted to the registration correction unit 127 via the network I/F 125 and the image bus I/F 126. Further, the image data processed by the registration correction unit 127 is transmitted to the image forming unit 131 via the device I/F 128.

On the host PC 110, the application software 202 that generates and edits the image data is executed by the controller unit 100. This application software 202 can be realized when the CPU 101 loads a program of the application software 202 stored in the HDD 104 into the RAM 102 and executes the program.

An operator generates the image data using the application software 202. The application software 202 includes a special-color specifying unit 203 as one of rendering functions. The operator of the application software 202 can select an arbitrary object in the image data using the special-color specifying unit 203 and specify the special color for the selected object. The special color referred to herein is a color which the operator wishes to guarantee.

At this point, the special-color specifying unit 203 generally performs special-color specification by four methods described below. A first method is to specify an absolute color which the operator wishes to guarantee with value of L*a*b*. A second method is to specify usage of a special-color material included in the image forming apparatus 130. A third method is to prepare a table of combinations of respective color materials for printing (e.g., each color material of cyan, magenta, yellow, and black, which will be referred to as CMYK hereinbelow) and the L*a*b* values of print results for the combined color materials, and then specify a CMYK value for obtaining the target absolute color. A fourth method is to set a red, green, blue (RGB) value before the color is changed to obtain the CMYK value for obtaining the target absolute color through the image processing that accompanies conversion of various colors.

When the special-color specifying unit 203 uses the above-described second method for specifying the usage of the special-color material included in the image forming apparatus 130, if the corresponding color material cannot be used for some reasons, an alternative color can be specified. The alternative color refers to the L*a*b* value, the CMYK value, or the RGB value that can express the L*a*b* value closest to the special-color material.

When the generated image data is printed, the application software 202 calls the printer driver 204 to transmit application data based on the generated image data to the printer driver 204. This printer driver 204 can be realized when the CPU 101 loads the program of the printer driver 204 stored in the HDD 104 into the RAM 102 and executes the program.

The printer driver 204 interprets the received application data and converts it into a page-description language (PDL) command. At this point, a command indicating that the special color is specified is given to the object for which the special color is specified.

The PDL command is transferred to a command analysis unit 206 of the controller unit 120 via the network 150.

The command analysis unit 206 interprets the PDL command received from the printer driver 204. A rendering-object creating unit 207 generates data (object information) of each object of intermediate data from the PDL command interpreted by the command analysis unit 206 and transmits the object information to a component color of special-color extracting unit 208.

At this point, a special-color object coordinate extracting unit 216 in the rendering-object creating unit 207 extracts coordinate information (special-color object coordinate information) of the object for which the special color is specified, of generated respective objects. The extracted coordinate information is transmitted to a transition-point control unit 211 described below.

The coordinate information of the object will be described. For example, when an upper left portion of the image data is used as a reference, a coordinate system is established in which its reference is defined as (x, y)=(0, 0), and the main-scanning direction is defined as an "x" axis, and the sub-scanning direction is defined as a "y" axis. The coordinate information of the special-color object is a coordinate of an upper-left end portion and a lower-right end portion of a rectangular region including the special-color object.

With the information described above, a width of the special-color object can be calculated from width=("x" coordinate value of lower right portion−"x" coordinate value of upper left portion). Further, a height of the special-color object can be calculated from height=("y" coordinate value of lower right portion–"y" coordinate value of upper left portion).

The component color of special-color extracting unit 208 extracts information (component color information) about which color material is to be used to finally print the specified special color. The extracted component color information is transmitted to the transition-point control unit 211. Further, the object information is transmitted to a rendering unit 209.

The rendering unit 209 converts (renders) the object information generated by the rendering-object creating unit 207 into bitmap data on a physical resolution coordinate printed by the image forming unit 131, and transmits the rendered image data to the image processing unit 210.

The image processing unit 210 performs on the image data rendered by the rendering unit 209 various image processing including edge emphasis, smoothing, and color conversion from the RGB value to the CMYK value, and generation processing of half-tone image data (color plate data) of respective color plates of CMYK to be printed by the image forming unit 131. The image processing unit 210 transmits to a transition-point processing unit 213 the image data on which the above-described processing is performed.

The transition-point control unit 211 reads the profile data of each color stored in the profile storage unit of the image forming unit 131, and controls the position of the transition point to offset the mis-registration of the image in the sub-scanning direction caused by the skew of the laser scanning of each color based on the profile data.

The transition-point control unit 211 includes a transition-point setting unit 212 (corresponding to a setting unit) to change and increase/decrease the position of the transition point for performing electronic registration correction.

This control can be realized by changing/setting the position of the transition point of each color plate based on the special-color object coordinate information and the component color information extracted by the special-color object coordinate extracting unit 216 and the component color of special-color extracting unit 208. An operation of the transition-point setting unit 212 will be described below.

Based on the transition point set by the transition-point setting unit 212, the transition-point processing unit 213 (corresponding to a correction unit) performs transition processing on each color-plate data transmitted from the image processing unit 210 at the transition point for each color plate.

This transition processing switches, when each color-plate data received by the transition-point processing unit 213 is read and transmitted to the image forming unit 131, a reading position of the color-plate data in the sub-scanning direction at the transition point of the color-plate data lined up in the main-scanning direction.

The processing for switching the reading position is defined as pixel transition. The image data on which the transition processing has been performed is transmitted to the image forming unit 131. In other words, the transition processing transmits the color-plate data having a dot pattern in which the mis-registration caused by the image forming unit 131 is taken into consideration.

FIGS. 3A to 3H illustrate a method for changing the transition point performed by the transition-point setting unit 212. A method for denoting each color is the same as that illustrated in FIG. 13. At a color combination portion having two or more component colors, the color unevenness is incurred in the special-color object by the electronic registration correction. The colors and how to indicate the transition direction of the transition point illustrated in FIGS. 3A to 3H are the same as those illustrated in FIG. 1.

Figure 3A:
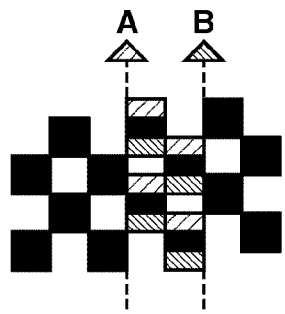
FIGS. 3A to 3H illustrate reduction of color unevenness by moving transition points.

FIG. 3A illustrates one or less transition point for each color of the component color on the special-color object. This transition point is previously set by the transition-point control unit 211 from the profile data stored in the profile storage unit of the image forming unit 131.

A blue special-color object includes a transition point where cyan is offset by one pixel at a position "A" in an upward direction. Color unevenness occurs near a boundary in the object. Further, the object includes a transition point where magenta is offset by one pixel at a position "B" in the upward direction. At the position "B", the color unevenness also occurs near a boundary of the transition point in the object.

Figure 3B:
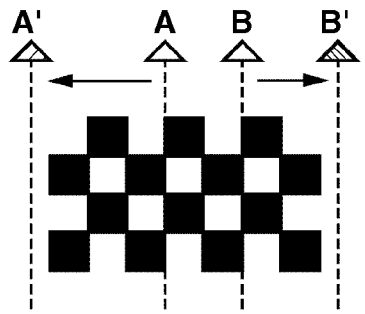

FIG. 3B illustrates the transition point set by the transition-point setting unit 212 to reduce the occurrence of the color unevenness on the special-color object in the case described above. The transition point of cyan located at the position "A" in a region of the special-color object is moved to an "A'" position located outside the region thereof, and the transition point of magenta located at the position "B" in the region of the special-color object is moved to a position "B'" located outside the region thereof. In other words, the transition-point setting unit 212 sets the new transition points at the positions "A'", "B'", and then cancels the transition points set at the positions "A", "B".

At this point, it is preferable that positions "A'" and "B'" of the transition points are each moved from the closest position of an end boundary of the special-color object in a main-scanning direction into a section of a neighborhood section (e.g., positions from the boundary of the end portion of the region of the object up to the positions outwardly four pixels away in the sub-scanning direction) up to a position a predetermined distance away outside the region of the special-color object.

This is performed to cancel the influence of the mis-registration caused by moving the transition points originally set at the positions "A", "B" at an outside of the region at an early stage. This neighborhood section may be a section in which the impact of the mis-registration outside the special-color object caused by moving the transition point can be cancelled.

Figure 3C:
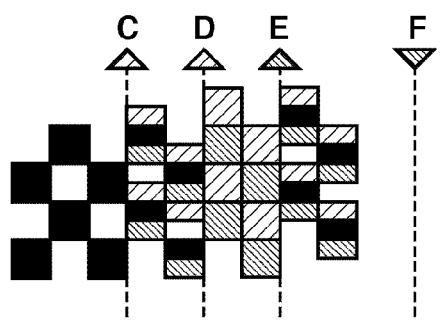

FIG. 3C illustrates a case where at least one color of the component colors includes two or more transition points on the special-color object. This transition point is previously set by the transition-point control unit 211 from the profile data stored in the profile storage unit of the image forming unit 131.

For example, at this point, there are two transition points of cyan in the upward direction at positions "C" and "D" on the special-color object, and there is one transition point of magenta in the upward direction at a position "E". Further, there is a transition point of magenta in the downward direction at a position "F" located outside the special-color object and closest thereto. At this point, the color unevenness occurs on the special-color object, near the boundaries of respective positions "C", "D", and "E".

Figure 3D:
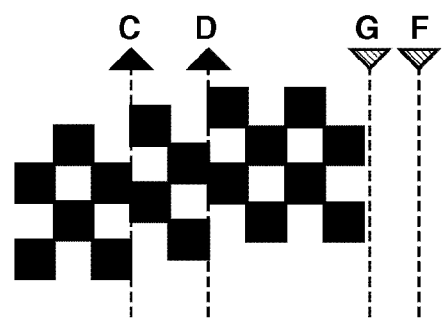

FIG. 3D illustrates the transition point set by the transition-point setting unit 212 to reduce the occurrence of the color unevenness on the special-color object in the case described above.

At the positions "C" and "D" of the color including a greatest number of transition points on the special-color object, which is cyan in this case, both cyan and magenta are transitioned by one pixel in the upward direction, in which cyan is normally transitioned. More specifically, the transition-point setting unit 212 sets new transition points of magenta at the positions "C" and "D", and cancels the transition point thereof set at the position "E".

By matching the position (transition position) of the transition point of magenta to that of cyan, in the region of the special-color object, the pixel transition is performed on magenta one extra time (corresponding to one pixel) in the upward direction. In other words, an excessive-transition amount caused by the pixel transition is one pixel. The excessive-transition amount is a difference of the transition amount between before and after the transition point is adjusted. The difference has occurred due to adjustment of the number or the directions of the transition points in the region of the special-color object.

To correct a correction amount of overall magenta through the main-scanning direction, it is preferable that the pixel transition in the opposite direction of the pixel transition for one extra time (corresponding to one pixel) to be otherwise performed be performed at as early as possible.

In FIG. 3D, if the pixel transition in the downward direction is performed at a position "G" located at a left side of the position "F" of the next transition point of magenta outside the special-color object, the original state can be recovered. Therefore, the transition-point setting unit 212 sets a new transition point in the downward direction at the position "G".

Figure 3E:
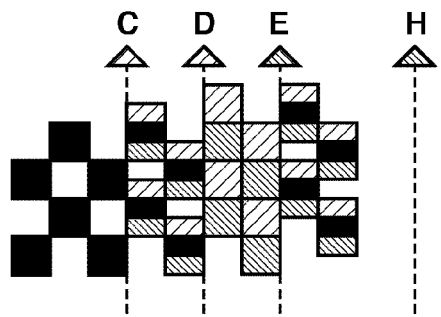

As with FIG. 3C, FIG. 3E illustrates a case where at least one color of the component colors includes two or more transition points on the special-color object. For example, at this point, there are two transition points of cyan in the upward direction at positions "C" and "D" on the special-color object, and there is one transition point of magenta in the upward direction at the position "E". Further, in this case, there is a transition point of magenta in the upward direction at a position "H" located outside the special-color object and closest thereto.

Figure 3F:
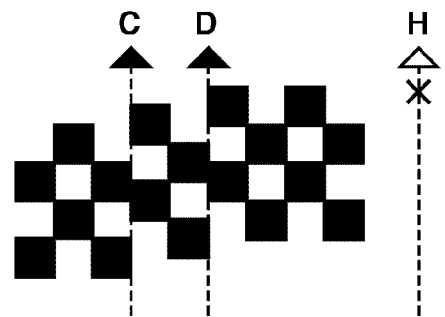

FIG. 3F illustrates the transition point set by the transition-point setting unit 212 to reduce the generation of the color unevenness on the special-color object in the case described above.

At the positions "C" and "D" of the color including a greatest number of transition points on the special-color object, which is cyan in this case, both cyan and magenta are transitioned by one pixel in the upward direction, in which cyan is normally transitioned. More specifically, the transition-point setting unit 212 sets new transition points of magenta at the positions "C", "D", and cancels the transition point thereof set at the position "E".

At this point, in the region of the special-color object, the pixel transition is performed on magenta one extra time (corresponding to one pixel) in the upward direction. To correct a correction amount of overall magenta, it is preferable that the pixel transition in the downward direction that is the opposite direction is performed as soon as possible so that the excessive-transition amount caused by the pixel transition in the upward direction for one extra time (corresponding to one pixel) to be otherwise excessively performed is cancelled.

However, in FIG. 3F, since the pixel transition in the downward direction can be cancelled with the excessive-transition amount caused by the pixel transition in the upward direction at the position "H", if the pixel transition is not performed at the position "H", a state of the pixel transition at aright side of the position "H" in the FIG. 3F can be returned to the state before transition processing has been performed. Thus, the transition-point setting unit 212 can cancel the transition point in the upward direction set at the position "H".

Figure 3G:
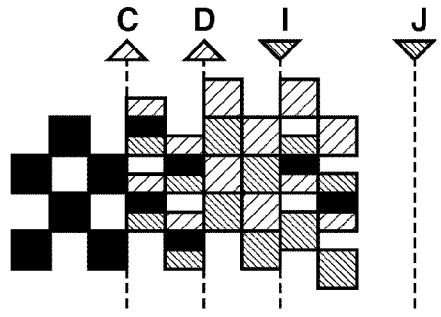

As with FIG. 3C, FIG. 3G illustrates a case where at least one color of the component colors includes two or more transition points on the special-color object. For example, at this point, there are two transition points of cyan in the upward direction at the positions "C" and "D" on the special-color object, and there is one transition point of magenta in the downward direction at a position "I". Further, in this case, there is a transition point of magenta in the downward direction at a position "J" located outside the special-color object and closest thereto.

Figure 3H:
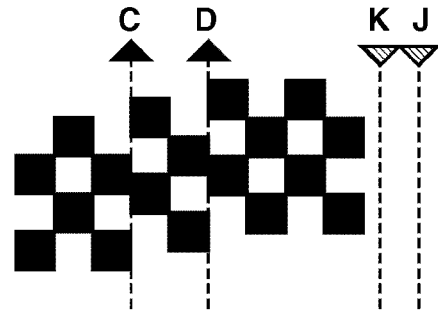

FIG. 3H illustrate the transition point set by the transition-point setting unit 212 to reduce the generation of the color unevenness on the special-color object in the case described above. At the positions "C" and "D" of the color including a greatest number of transition points on the special-color object, which is cyan in this case, both cyan and magenta are transitioned (moved) by one pixel in the upward direction, in which cyan is normally transitioned.

More specifically, the transition-point setting unit 212 sets new transition points of magenta at the positions "C" and "D", and cancels the transition point thereof set at the position "I". At this point, in the region of the special-color object, the pixel transition is performed on magenta three extra times (corresponding to three pixels) in the upward direction.

In this case, the excessive-transition amount is three pixels in the upward direction. To correct a correction amount of overall magenta, it is preferable that the pixel transition in an opposite direction of the pixel transition for three extra times (corresponding to three pixels) to be otherwise excessively performed is performed at a possible earliest stage.

FIG. 3H is an example in which the pixel transition is performed in the downward direction at one position located at the left side of the position "J" of the next transition point of magenta outside the special-color object and two positions located at the right side of the position "J" outside the special-color object.

If the transition points in the downward direction for three times can be set at the left side of the position "J", it is preferable that the transition points for three times are set at a position located at the left side of the position "J" outside the special-color object.

FIGS. 3D and 3H illustrate examples in which the new transition point is set at the position located outside the special-color object and closer thereto, however, when the transition points are set, the positions of objects other than the special-color object may be further considered.

For example, the transition-point setting unit 212 may set the new transition point at a position located outside the special-color object and closer thereto, and further a position on which an object other than the special-color object is not located.

In the examples illustrated in FIGS. 3C to 3F, of the component colors of the special-color object, according to the positions and the directions of the transition points of the color plate having a largest number of transition points, the positioned and the directions of the transition points of other color plates are adjusted. However, of the color plates having a least number of transition points on the special-color object or the color plates having a plurality of colors, according to the positions and the directions of the transition points of an arbitrary color plate such as a color plate having a smallest or medium number of transition points, the positions and the directions of the transition points of other color plates may be adjusted.

Further, in the examples illustrated in FIGS. 3D and 3G, the transition points outside the special-color object are continuous, however, one transition point may be set to perform the pixel transition for a plurality of pixels at the transition point in the sub-scanning direction.

As described above, when the special-color object includes two or more component colors and the transition points of the component colors are located on the special-color object, the transition point is changed by the above-described method to reduce the color unevenness generated near the boundary of the transition point on the special-color object.

FIG. 4 is a flowchart of processing illustrating the transition processing described above. When object information includes the special-color object, the special-color object coordinate extracting unit 216 extracts a starting coordinate and an ending coordinate of each of the main-scanning direction and the sub-scanning direction of the special-color object as special-color-object coordinate information. In step S401, with this processing, in which position and in what size the special-color object is located in a whole image can be recognized.

Next, the component color of special-color extracting unit 208 extracts component colors of the special-color object. When the special-color specifying unit 203 of the application software 202 specifies the special color using the L*a*b* value or the RGB value, the component color of special-color extracting unit 208 converts these values into the CMYK value to extract the colors included in the object. When the special-color specifying unit 203 specifies the special color with the CMYK value, in step S402, the component color of special-color extracting unit 208 extracts the color included in the special-color object.

Next, in step S403, the transition-point setting unit 212 determines whether the special-color object includes two or more component colors. When it is determined that the special-color object includes less than two component colors (NO in step S403), the special-color object coordinate extracting unit 216 determines whether the special-color object currently processed is a final special-color object of the special-color object to be processed.

Further, when it is determined that the image data includes other unprocessed special-color object (NO in steps S405), the processing returns to step S401, and repeatedly performs various processing and determinations. When, of the special-color objects to be processed, the processing on the final special-color object has been finished (YES in step S405), the transition processing ends.

When it is determined that the special-color object includes two or more component colors (YES in step S403), in step S404, the transition-point setting unit 212 reads the profile stored in the profile storage unit of the image forming unit 131 and determines whether the special-color object includes a transition point of the component color. This can be determined by comparing, based on the read profile, the position of the transition point of each color of C, M, Y, K that is previously set with the coordinate (position) of the special-color object extracted in step S401.

When the special-color object includes no transition point of the component color (NO in step S404), the processing proceeds to step S405. When the special-color object includes the transition point of the component color (YES in step S404), the processing proceeds to step S406.

In step S406, the transition-point setting unit 212 determines whether any of component colors includes a predetermined number of transition points or more (e.g., two or more, plural) on the special-color object.

On the special-color object, a case where each component color includes less than a predetermined number of transition points (e.g., less than two) refers to an example illustrated in FIG. 3A. In step S407, the transition-point setting unit 212 sets the transition point at a position outside the special-color object as described with reference to FIG. 3B, and the processing proceeds to step S405.

With this processing, the generation of the color unevenness on the special-color object can be reduced. Further, since the transition point is set to a position outside the special-color object and thus a dot pattern on the special-color object of color-plate data is not changed, stripes in the same color plate that can be generated near the boundary of the transition point caused by the transition processing, can be also reduced.

In step S418, the transition-point setting unit 212 determines whether there is a plurality of colors, in which respective component colors of the special-color object include a same number of transition points for each component color, and the number is maximum through each component color. When no such colors are included (NO in step S418), the processing proceeds to step S408. Further, when such colors are included (YES in step S418), the processing proceeds to step S419.

A case where it is determined in step S406 that respective component colors include two or more transition points and further where the plurality of colors described in step S418 are not included refers to a case as illustrated in FIGS. 3C, 3E, and 3G.

In FIGS. 3C, 3E, and 3G, the special-color object includes two transition points of cyan (corresponding to a first color) and one transition point of magenta (corresponding to a second color).

FIGS. 3C, 3E, and 3G are schematically illustrated, and thus the distance between two transition points of cyan are illustrated as an amount of several pixels. However, actually, the distance between the transition points of the same color includes, for example, an amount of 700 pixels, which varies depending on the position in the main-scanning direction, and the transition processing is not performed for every several pixels according to the present exemplary embodiment.

In step S408, the transition-point setting unit 212 extracts the color in which the transition is performed most frequently on the special-color object. In step S408, this color is referred to as a color "A" according to the present exemplary embodiment. In FIGS. 3C and 3E, the color "A" is cyan.

In step S409, the transition-point setting unit 212 extracts the number of transition points of the color "A". In the examples illustrated in FIGS. 3C and 3E, a case where cyan is transitioned twice is extracted.

When it is determined that there are such colors (YES in step S418), in step S419, the transition-point setting unit 212 sets a higher-priority color, of corresponding colors, as the color "A" in order of predetermined priority, and then the processing proceeds to step S409. This priority order may be an order of C, M, Y, K for example, and the present invention is not limited by how to determine the priority.

In step S410, the transition-point setting unit 212 sets the transition point of the colors other than the color "A" extracted in step S408 at the same position and in the same direction of those of the color "A". As a result, the number of transition points of the colors other than the color "A" is increased/decreased as described with reference to FIGS. 3A to 3H. By lining up the position and the direction of the transition points of respective component colors on the special-color object, the generation of the color unevenness near the boundary of the transition point of the color "A" on the special-color object can be reduced.

In step S411, the transition-point setting unit 212 measures the number of transition points that are increased/decreased by performing the pixel transition at the same position as the color "A" and the direction thereof. For example, according to a measurement result, magenta includes one transition point (corresponding to one pixel), and the pixel transition is performed in the upward direction in FIGS. 3D and 3F.

Further, in FIG. 3H, the number of transition points of magenta is increased by two in the upward direction and decreased by one in the downward direction. When there are a plurality of increased/decreased transition points, or when the transition points have different directions, for example, the upward direction may be counted as "plus" and the downward direction may be counted as "minus". As a result, when a value is calculated in a plus direction, the transition points is increased as many in the upward direction, and the transition points is increased as many in the downward direction when a value is calculated in a minus direction.

FIGS. 3D and 3F indicate plus "1" (+1), and FIG. 3H indicates plus 3 (+3).

In step S420, the transition-point setting unit 212 determines whether the number of the transition points (measured value) measured in step S411 is "0". When the measured value is "0" (YES in step S420), the processing proceeds to step S405. When not "0" (NO in step S420), the processing proceeds to step S412.

In step S412, the transition-point setting unit 212 determines whether the transition direction of the next transition point of each color other than the color "A" outside the special-color object is same as that measured in step S411. When it is determined that it is the same direction (YES in step S412), the processing proceeds to step S415. When it is determined that it is not the same direction (NO in step S412), the processing proceeds to step S413.

The next transition point outside the special-color object when it is determined to be the same direction is, for example, the transition point of magenta of the position "H" illustrated in FIG. 3E. Further, the next transition point outside the special-color object when it is determined not to be the same direction is, for example, the transition point of magenta of the position "F" illustrated in FIG. 3C or the transition point of magenta of the position "J" illustrated in FIG. 3G.

The transition-point setting unit 212 sets the transition point for cancelling the excessive-transition amount caused by the pixel transition at the transition point that is increased/decreased in step S410, outside the region of the special-color object (preferably between the next transition point and the end portion of the special-color object).

The example of the transition points illustrated in FIG. 3D indicates that the transition point of magenta in the downward direction is set at the position "G", which corresponds to a case where plus "1" that is the value measured in step S411 is decreased by "1" (downward direction) to be "0".

Further, the example illustrated in FIG. 3H indicates that, in step S413, the transition points of magenta in the downward direction are set at the positions "K", "L", and "M", which correspond to a case where plus "3" (upward direction) that is the value measured in step S411 is decreased by "3" (downward direction) to be "0".

In step S414, the transition-point setting unit 212 sets the next transition point outside the special-color object (e.g., position "F" in FIG. 3C, position "J" in FIG. 3H) other than a new transition point set in step S413 as it is, and the processing proceeds to step S405.

In step S415, the transition-point setting unit 212 determines whether one transition point is measured and increased/decreased in step S411. When one transition point is increased/decreased (YES in step S415), the processing proceeds to step S417. When not one transition points are increased/decreased (NO in step S415), the processing proceeds to step S416.

When one transition point is increased (YES in step S415), in step S417, the transition-point setting unit 212 sets the next transition point previously set outside the special-color object to be canceled, and the processing proceeds to step S405.

To cancel the next transition point outside the special-color object refers to, for example, canceling the transition point of magenta in the upward direction at the position "H" illustrated in FIG. 3E, as with canceling the set transition point illustrated in FIG. 3F, not to perform the pixel transition of magenta at the position "H". This processing corresponds to a case where the plus "1" (upward direction) measured in step S411 is replaced with the transition point (plus "1") in the upward direction at the position "H".

When more than one transition points are increased/decreased in step S415 (NO in step S415), in step S416, the transition-point setting unit 212 sets the transition point for cancelling the excessive-transition amount of the pixel transition at the transition point increased/decreased in step S410 outside the special-color object (preferably between the next transition point and the end portion of the special-color object).

More specifically, in step S416, the transition point for cancelling the excessive-transition amount of the pixel transition at the transition point that is increased/decreased in step S410 is set by the number of points measured in step S411-1. Subsequently, the processing proceeds to step S417.

In the above-described steps, by performing the processing on each component color on the special-color object, for example, the transition processing described with reference to FIG. 3 can be realized to reduce the generation of the color unevenness on the special-color object.

According to the present exemplary embodiment, by moving or increasing the transition point of the component color on the special-color object, a registration-correction amount in the main-scanning direction is locally changed. However, since the number of the transition points in the main-scanning direction outside the special-color object is also adjusted, the registration-correction amount through the main-scanning direction of the image data is not changed.

As a result, the registration correction appropriately functions in the overall image data. Particularly, when the number of transition points on the special-color object is adjusted from the end portion of the special-color object up to the next transition point outside the special-color object, in the region outside the next transition point outside the special-color object, the conventional electronic registration correction correctly functions.

Further, regarding colors other than the component colors of the special-color object, it is not necessary to change the position of the transition point set based on the previously measured profile.

Figure 6:
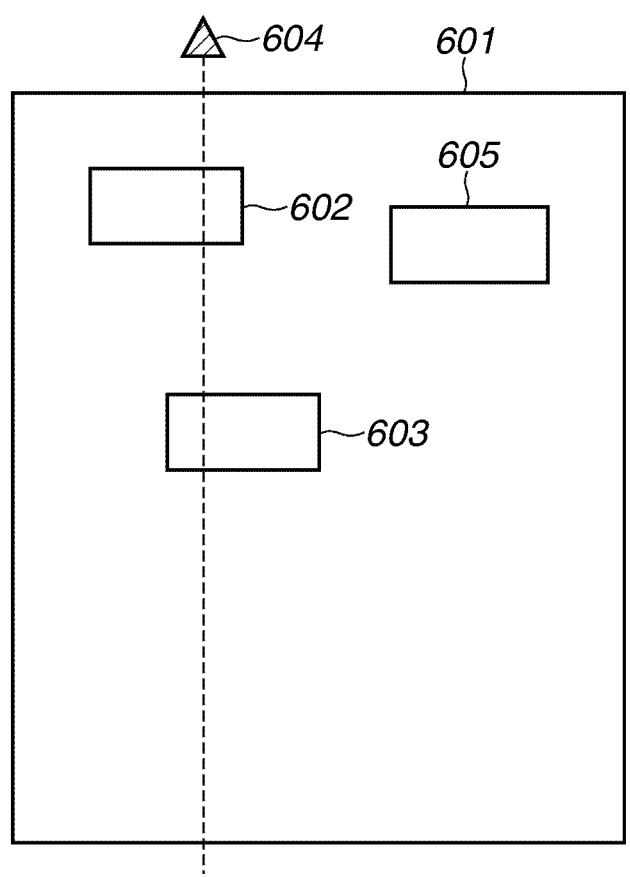
FIG. 6 illustrates an example in which image data includes a plurality of special-color objects.

FIG. 6 illustrates an example in which the image data on which the registration correction is to be performed includes a plurality of special-color objects. A first special-color object 602, a second special-color object 603, and a third special-color object 605 are disposed in image data 601. FIG. 6 illustrates a case where both of the special-color objects include a transition point 604 of a component color that is common to the first and second special-color objects.

In this case, when the transition point 604 is a target of changing the position, when the processing for setting the transition point described in the first exemplary embodiment is performed for each special-color object, the changed positions of the transition point may be inconsistent. For example, when the transition-point setting unit 212 sets the special-color object 602 to move the transition point to a right side and the special-color object 603 to move the transition point to a left side, inconsistency occurs.

Figure 5:
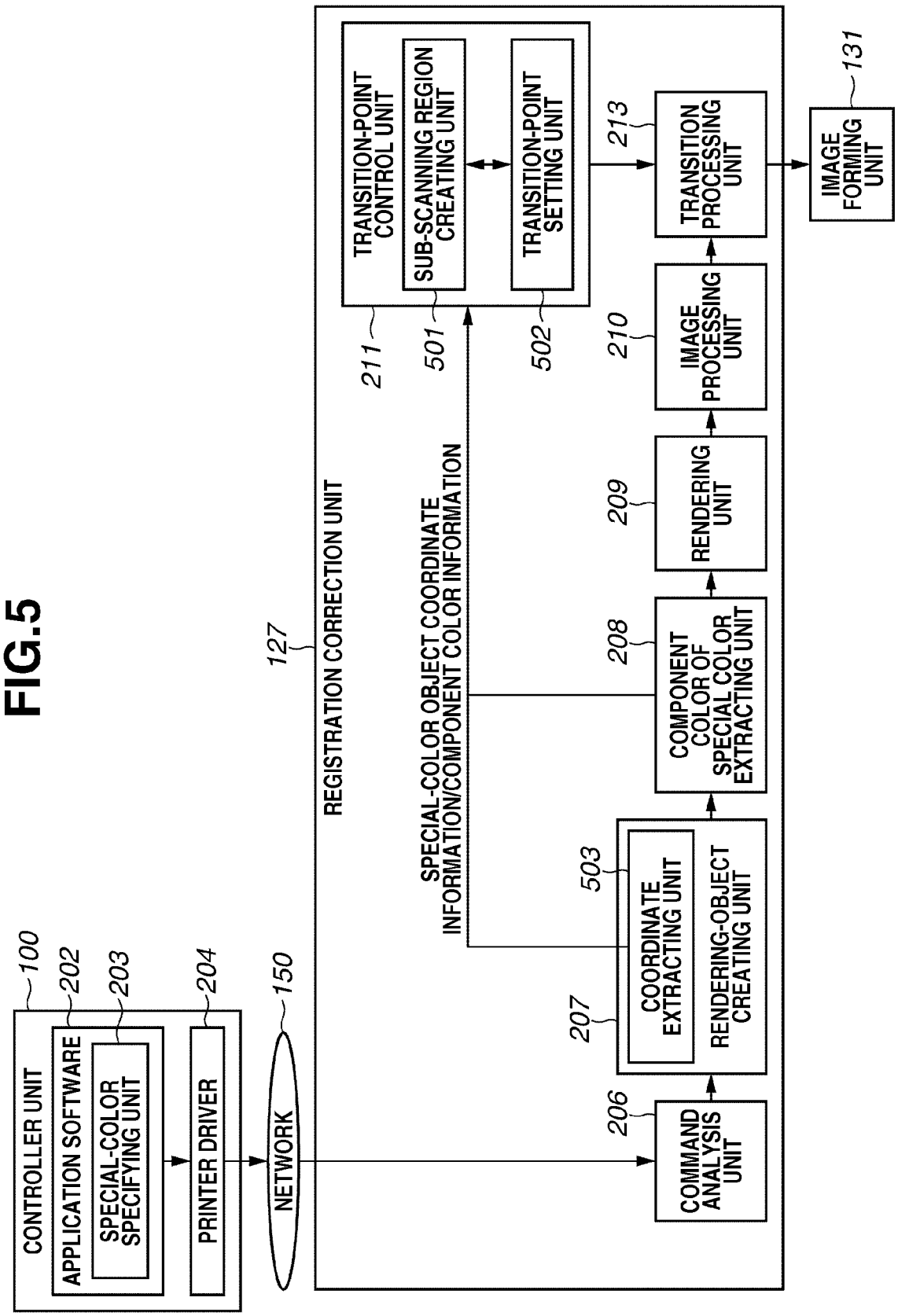
FIG. 5 is a block diagram of processing for realizing a second exemplary embodiment.

FIG. 5 illustrates a processing block for guaranteeing the color of the object to be specified with the special color by controlling the position of the transition point when the image data includes a plurality of special-color objects.

The hardware configuration of the host PC and the image forming apparatus according to the present exemplary embodiment is similar to that of the host PC 110 and the image forming apparatus 130 according to the first exemplary embodiment if not otherwise specified. Further, a function configuration illustrated in FIG. 5 is similar to that illustrated in FIG. 2 described according to the first exemplary embodiment if not otherwise specified, and elements having the same reference numerals in FIG. 2 perform similar operations as those in FIG. 2.

According to the present exemplary embodiment, the transition-point control unit 211 includes a sub-scanning region creating unit 501 (corresponding to a dividing unit) and a transition-point setting unit 502. The sub-scanning region creating unit 501 performs processing for dividing a region in the sub-scanning direction based on the coordinate information about the special-color object.

The transition-point setting unit 502 reads the profile data stored in the profile storage unit of the image forming unit 131, and, based on the profile data, performs processing for setting the position of the transition point on the special-color object.

The coordinate extracting unit 503 extracts the starting coordinate and the ending coordinate of each of the main-scanning direction and the sub-scanning direction of the special-color object in the image data on which the registration correction is to be performed.

Figure 7:
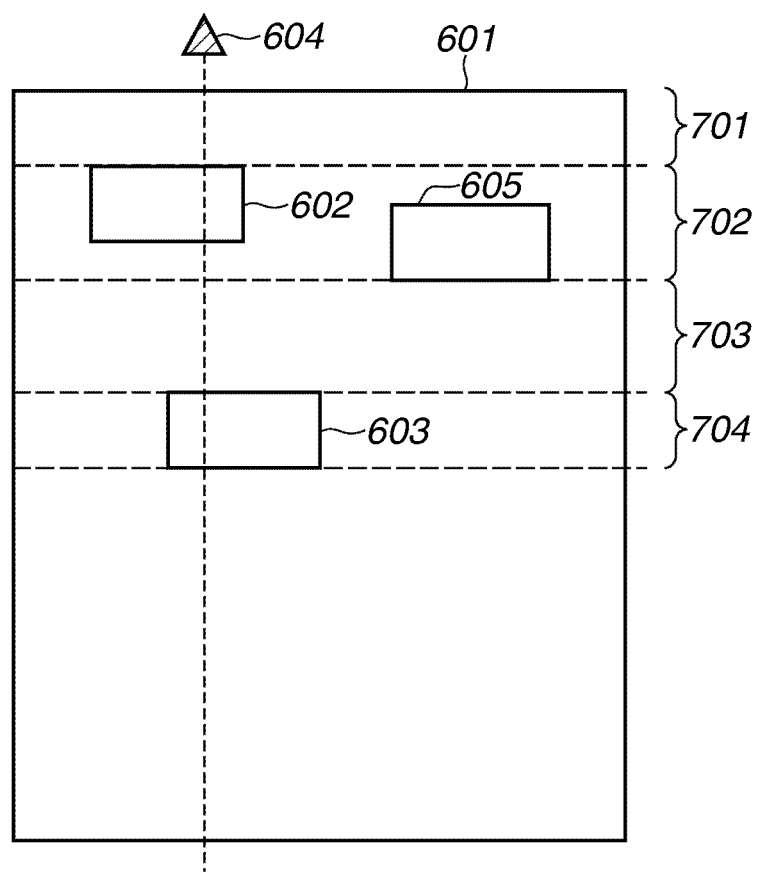
FIG. 7 illustrates an example of a sub-scanning region.

FIG. 7 illustrates an example of a sub-scanning region generated by the sub-scanning region creating unit 501 on image data 601 including a plurality of special-color objects as illustrated in FIG. 6.

By analyzing the coordinate information about the special-color object, the sub-scanning region creating unit 501 can detect no overlapped portion but a space between the special-color objects in the sub-scanning direction. As a result, the sub-scanning region creating unit 501 can detect a first sub-scanning region 701 as a region including no special-color object (corresponding to a non-existing region).

In disposing the special-color object 602 (corresponding to a first special-color object) and the special-color object 605, an interval is not included in the sub-scanning direction. Thus, the sub-scanning region creating unit 501 detects a region determined by coordinate end portions of the two special-color objects that do not overlap each other in the sub-scanning direction as a second sub-scanning region 702 (corresponding to a first existing region).

As with the first sub-scanning region 701, the sub-scanning region creating unit 501 detects a third sub-scanning region 703 as a region including no special-color object (non-existing region).

Further, other special-color object overlapping the special-color object 603 (corresponding to the second special-color object) in the sub-scanning direction is not included. Thus, the sub-scanning region creating unit 501 detects a region determined by the coordinate end portions of the special-color object 603 in the sub-scanning direction as a fourth sub-scanning region 704 (corresponding to a second existing region).

By performing the above-described operations on the image data 601, the sub-scanning region creating unit 501 generates one or a plurality of sub-scanning regions.

Figure 8:
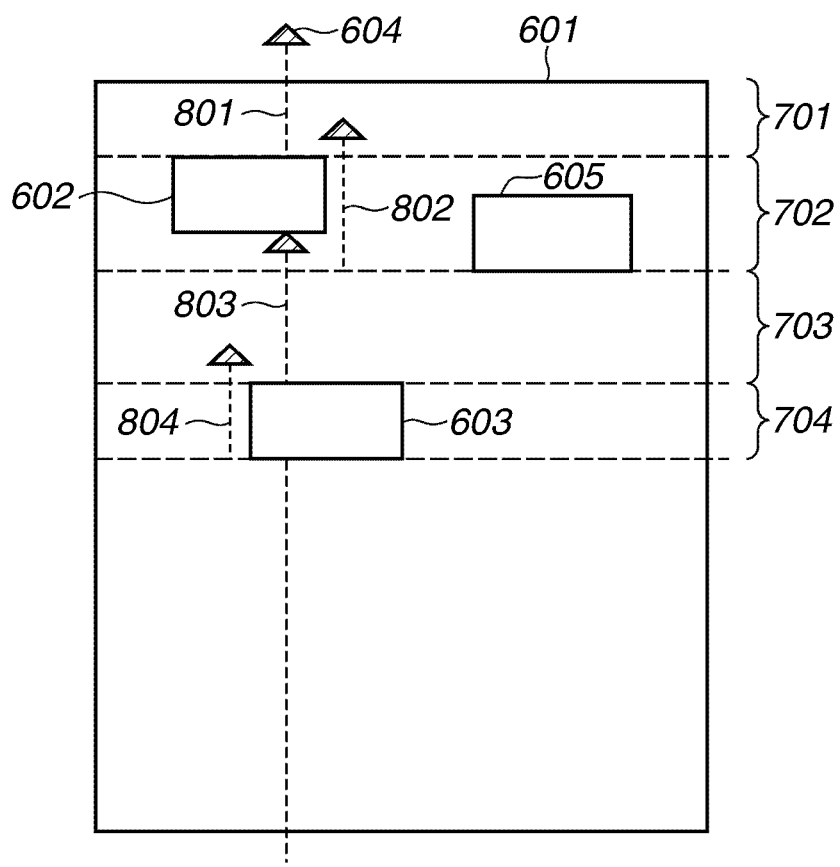
FIG. 8 illustrates an example in which transition points are moved according to the second exemplary embodiment.

FIG. 8 illustrates the transition points set by the transition-point setting unit 502 based on a result of generating a regions by the sub-scanning region creating unit 501.

Since the first sub-scanning region 701 includes no special-color object, in the region of the first sub-scanning region 701, the transition-point setting unit 502 does not change the position of the transition point 604 set based on the profile data, but sets the transition point 801 at the same position.

Since the special-color object includes the transition point of the component color in the second sub-scanning region 702, the transition-point setting unit 502 sets the transition point 802 that is moved into the region of the second sub-scanning region 702.

FIG. 8 illustrates an example in which the special-color object includes one or less transition point of the component color for each color as described in the first exemplary embodiment. When the special-color object includes two or more transition points for at least one color of the component color on the special-color object, the same processing as that according to the first exemplary embodiment may be performed.

Since the special-color object is not included in the third sub-scanning region 703, as with the first sub-scanning region 701, the transition-point setting unit 502 does not change the position of the transition point 604 in the region of the third sub-scanning region 703, and sets the transition point 803 at the same position.

Since the special-color object includes the transition point of the component color in the fourth sub-scanning region 704, in the region of the fourth sub-scanning region 704, the transition-point setting unit 502 sets a transition point 804 acquired by moving the transition point 604. The position of the transition point in the region of the fourth sub-scanning region 704 is set regardless of the position of the transition point changed within the region of the second sub-scanning region 702.

Figure 9:
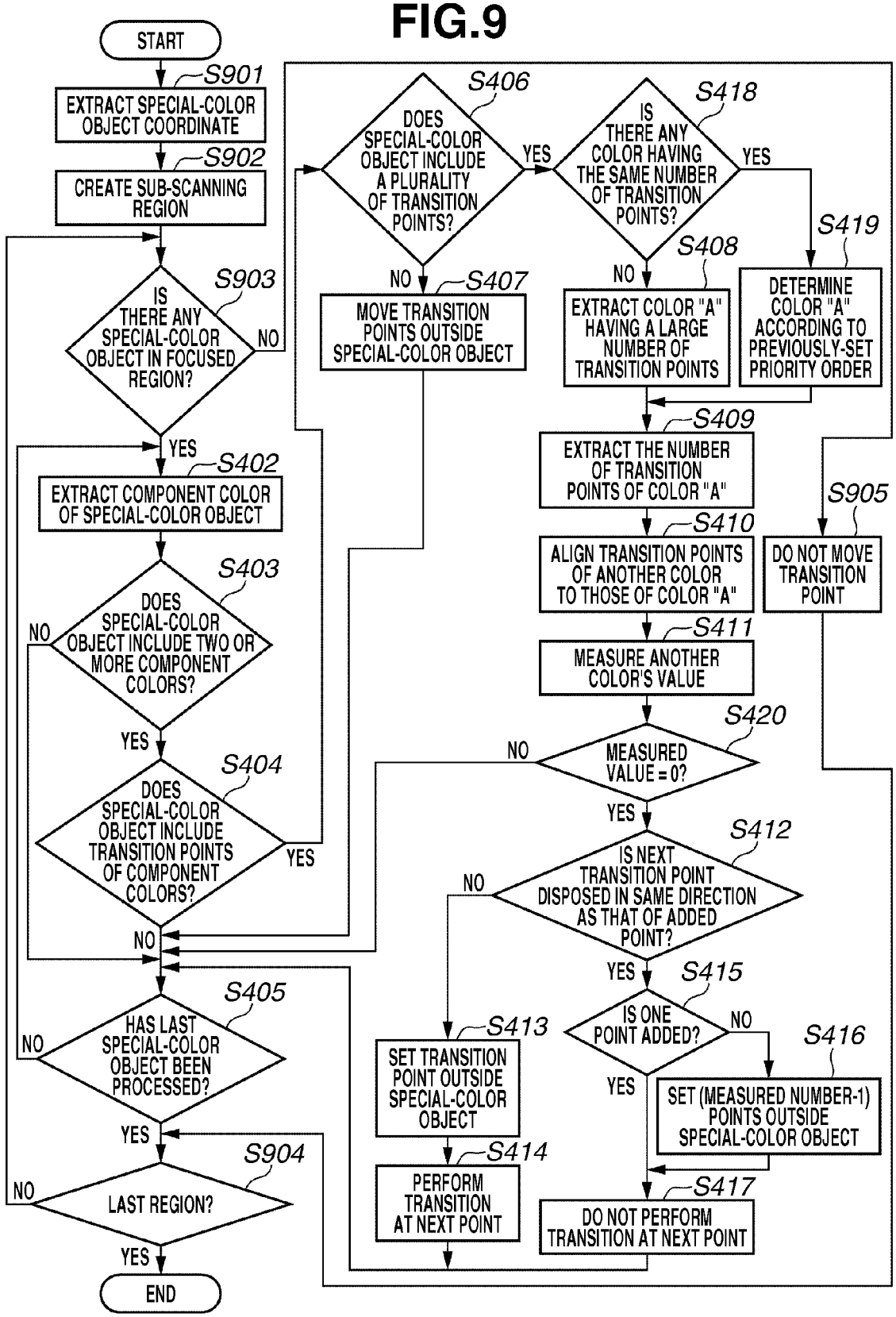
FIG. 9 is a flowchart illustrating operations of a sub-scanning region generating unit and a transition-point setting unit.

FIG. 9 is a flowchart illustrating processing for setting the positions of the transition points. The coordinate extracting unit 503 extracts the starting coordinate and the ending coordinate in each of the main-scanning direction and the sub-scanning direction of the special-color object in the image data. In step S901, with this processing, in which position and in what size the special-color object is located in a whole image can be recognized.

In step S902, based on the coordinate information about the extracted object, the sub-scanning region creating unit 501 creates regions in which the special-color object is included and not included in the sub-scanning direction of the image data. Subsequently, the following processing will be performed in order on each region in the sub-scanning direction of the image data.

In step S903, the transition-point setting unit 502 determines whether the special-color object is included in the region of the marked sub-scanning region.

When the special-color object is included (YES in step S903), the processing proceeds to step S402, and the transition-point setting unit 502 performs the operations up to the processing in step S405 described with reference to FIG. 4 in the focused sub-scanning region. This processing sets the position of the transition point to be changed in the focused sub-region.

The position of the transition point in the region of a certain sub-scanning region is set regardless of the position of the transition point changed in other sub-scanning region. The processing in FIG. 9 having the same step number as that in FIG. 4 has the same processing as that in FIG. 4.

When the processing on the final special-color object in the focused region is finished (YES in step S405), in step S904, the transition-point setting unit 502 determines whether the focused region is the final sub-scanning region. When other region remains in the sub-scanning direction, the processing returns to step S903, and the processing is repeatedly performed. Further, when it is determined that the final sub-scanning region has been processed (YES in step S904), the processing for setting the position of the transition point ends.

When it is determined that the special-color object is not included in the sub-scanning region (NO in step S903), in step S905, the transition-point setting unit 502 does not change the transition point set based on the profile data. Subsequently, the processing proceeds to step S904.

Figure 12A:
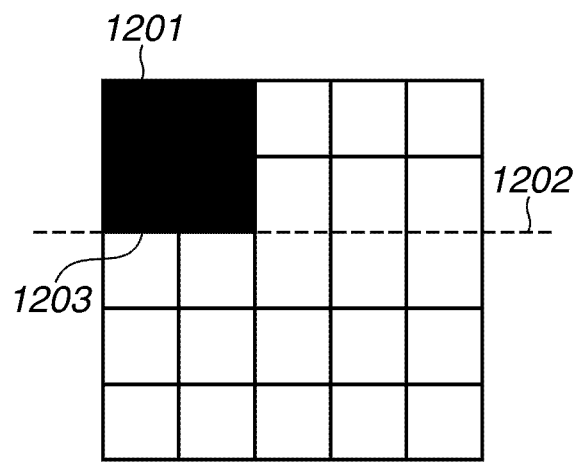
FIGS. 12A and 12B illustrate examples in which a boundary of a sub-scanning region is located at an end portion of a special-color object and in which the boundary of the sub-scanning region is located away from the end portion thereof.

For example, as the boundary between the first and second sub-scanning regions, an end-portion boundary at an upper side of the special-color object 602 may be included. Further, as the boundary between the second and third sub-scanning regions, an end-portion boundary at a lower side of the special-color object 605 may be included. Further, as the boundary between the third and fourth sub-scanning regions, an end-portion boundary at an upper side of the special-color object 603 may be included. In other words, as with an example illustrated in FIG. 12A, as a boundary line 1202 between sub-scanning regions, an end boundary 1203 of a special-color object 1201 may be included.

Figure 12B:
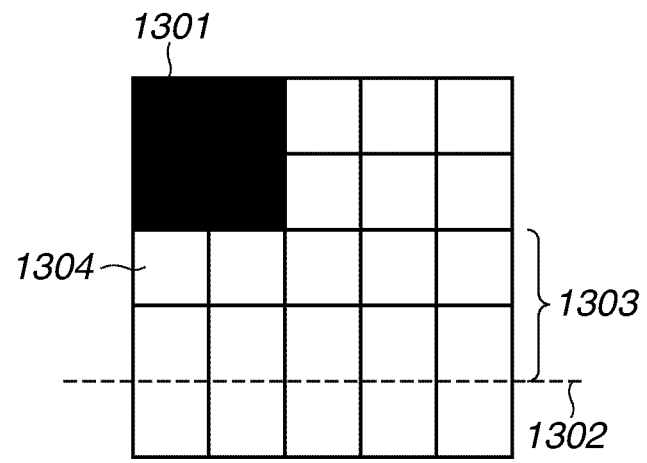

With this arrangement, even if the adjacent special-color objects are included in the sub-scanning direction, the special-color objects can be divided into different regions and thus each transition point can be independently moved. Further, as with an example illustrated in FIG. 12B, a boundary 1302 in each sub-scanning region may be provided at a position a predetermined section 1303 away from an end-portion boundary 1304 of the special-color object 1301 in the sub-scanning direction, where other special-color object is not included.

By the method described above, even if the image data includes a plurality of special-color objects, the generation of the color unevenness can be reduced on the special-color object.

According to the above-described exemplary embodiment, in step S407, the transition points of respective component colors are set outside the region of the special-color object, however, the transition points may be set to coincide with one another in the region thereof.

When the transition points are set to coincide with one another in step S407, the transition positions and the transition directions of transition points of the respective component colors may be set to coincide with one another. Since the transition points coincide with one another as described above, the generation of the color unevenness near the boundary of the transition point can be reduced.

According to the above-described exemplary embodiments, the transition-point processing unit 213 performs the transition processing to correct the mis-registration, however, the transition-point processing unit 213 may perform the conventional interpolation processing after the transition processing has been performed.

In this case, if the interpolation processing is not performed near the boundary of the transition point in the region of the special-color object but performed near the boundary thereof outside the special-color object, the generation of the color unevenness caused by a smoothing effect of color by the interpolation processing can be reduced.

Further, according to the above-described exemplary embodiments, the special-color specifying unit 203 is realized on the host PC 110, but may be realized on the image forming apparatus 130, or may be realized another information processing apparatus connected via a network.

Furthermore, according to the above-described exemplary embodiments, as color agent used by the image forming apparatus 130 for printing, general four colors of C, M, Y, K are cited as an example herein, however, the present invention is not limited thereto. When each image forming apparatus includes unique special colors, it can be operated as described above.

According to the exemplary embodiments, the registration correction unit 127 is realized by a hardware circuit, however, a function equivalent to a function realized thereby may be realized by performing a program stored in the HDD 124 by the CPU 121. In this case, the HDD 124 stores a computer program for correcting the registration described in the exemplary embodiments, and the CPU 121 may load this computer program into the RAM 122 to execute it.

The purpose of the present invention can be achieved by supplying to a system or an apparatus a computer-readable storage medium that records a program code of software realizing the function of the above-described exemplary embodiments. Moreover the purpose of the present invention can be also achieved by reading and performing the program code stored in the storage medium by a computer (or CPU, or micro processing unit (MPU)) of the system or the apparatus.

In this case, the program code read from the storage medium itself realizes the function of the exemplary embodiments described above.

As the storage medium for supplying the program code, for example, a flexible disk, a hard disk, an optical disk, a magnetic optical disk, a compact disk-read only memory, a CD-readable, a non-volatile memory card, and a ROM can be used.

Further, by performing the program code read by the computer, the function of the above-described exemplary embodiments can be realized. Furthermore, a case is also included where, based on an instruction of the program code, an operating system (OS) running on the computer performs apart of or all actual processing to realize the above-described exemplary embodiments.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-082889 filed Apr. 4, 2011, which is hereby incorporated by reference herein in its entirety.

What is claimed is:

1. An image processing apparatus processing image data comprising:

an extracting unit configured to extract a component color of a special-color object specified in the image data;
a setting unit configured to, in a case where a plurality of component colors are included and a transition point of the component color is included in a region of the special-color object, set outside the region of the special-color object the transition point located therein;
a correction unit configured to, for color-plate data of a plurality of color plates acquired from the image data, perform pixel transition of the color plate data in a sub-scanning direction at the transition point aligned in a main-scanning direction; and
an image forming unit configured to form an image corresponding to the color-plate data corrected by the correction unit.

2. The image processing apparatus according to claim 1, wherein the special-color object includes a first color and a second color different from the first color as the component color; and
wherein, in a case where the number of transition points of each component color located in a region of the special-color object is less than a predetermined number, the setting unit sets outside the region of the special-color object a position of the transition point of each component color located in the region, and in a case where the number of the transition points of the first color located in the region of the special-color object is equal to or greater than a predetermined number, sets the positions of the transition points of the first and second colors located in the region to coincide with each other.

3. The image processing apparatus according to claim 2, wherein, in a case where the number of transition points of the first color located in the region of the special-color object is equal to or greater than the predetermined number, the setting unit sets the positions of the transition points of the first and second colors located in the region and directions of the pixel transition at the aligned transition points of the first and second colors, to be matched.

4. The image processing apparatus according to claim 3, wherein, in a case where the number of transition points of the first color located in the region of the special-color object is equal to or greater than the predetermined number and the number of transition points of the first color located in the region is different from that of the second color located therein, the setting unit sets the transition point of the second color outside the region of the special-color object by increasing/decreasing the number of the transition points of the second color, matching the positions of the transition points of the first and second colors in the region to cancel the excessive-transition amount caused by the pixel transition at the increased/decreased transition points of the second color.

5. The image processing apparatus according to claim 1, wherein the setting unit sets the transition point set outside the region in a section up to a position a predetermined distance away from a position of an end portion boundary of the special-color object in the main-scanning direction.

6. The image processing apparatus according to claim 1, further comprising a dividing unit configured to divide the image data into an existing region in which the special-color object is included in the sub-scanning direction and a non-existing region in which the special-color object is not included therein,
wherein the setting unit sets a position of the transition point of each component color to be changed in the region of the existing region, and sets the position of the transition point of each component color not to be changed in the non-existing region.

7. The image processing apparatus according to claim 6, wherein, in a case where the image data includes the first and second special-color objects that do not overlap with each other in the sub-scanning direction, the dividing unit divides the image data into a first existing region in which the first special-color object is included in the sub-scanning direction and the second existing region in which the second special-color object is included therein; and
wherein, regardless of the position of the transition point of each component color of the first special-color object set in the first existing region, the setting unit sets the position of the transition point of each component color of the second special-color object in the second existing region.

8. The image processing apparatus according to claim 1, wherein, in a case where the transition point is located in the region of the special-color object, the correction unit does not perform interpolation processing on the pixel transition at the transition point for each of the color plate data, and in a case where the transition point is located outside the region of the special-color object, the correction unit performs the interpolation processing on the pixel transition at the transition point.

9. A control method for controlling an image processing apparatus processing image data, the control method comprising:
extracting a component color of a special-color object specified with a special color in the image data;
setting, in a case where a plurality of component colors are included and a transition point of the component color is included in a region of the special-color object, the transition point located therein outside the region of the special-color object;
correcting color-plate data of a plurality of color plates acquired from the image data, by performing pixel transition process of the color plate data in a sub-scanning direction at the transition point aligned in a main-scanning direction; and
forming an image corresponding to the color-plate data corrected by the pixel transition process.

10. A non-transitory computer-readable storage medium storing a program which causes a computer to perform an image processing method, the image processing method comprising:
extracting a component color of a special-color object specified with a special color in image data;
setting, in a case where a plurality of component colors are included and a transition point of the component color is included in a region of the special-color object, the transition point located therein outside the region of the special-color object;
correcting color-plate data of a plurality of color plates acquired from the image data, by performing pixel transition process of the color plate data in a sub-scanning direction at the transition point aligned in a main-scanning direction; and
forming an image corresponding to the color-plate data corrected by the pixel transition process.

11. An image processing apparatus in which mis-registration in a sub-scanning direction of an image to be formed by a plurality of image forming units is corrected by performing in a sub-scanning direction image transition at a transition point lined up in a main-scanning direction, the image processing apparatus comprising:

an extraction unit configured to extract a component color of a special-color object specified with a special color in the image;

a setting unit configured to, in a case where a plurality of component colors are included and the transition point is included in a region of the special-color object in image data of the image corresponding to the component color, set the transition point located therein outside the region of the special-color object; and a correction unit configured to, for the image data of the image corresponding to each of the plurality of image forming units, perform pixel transition at the transition point.

* * * * *